United States Patent [19]

Bowden et al.

[11] 4,329,404

[45] May 11, 1982

[54] RECHARGEABLE NON-AQUEOUS CELLS WITH COMPLEX ELECTROLYTE SALTS

[75] Inventors: William L. Bowden, Nashua, N.H.; Donald L. Foster, Somerville; Han C. Kuo, Burlington, both of Mass.; Peter R. Moses, Windham, N.H.

[73] Assignee: Duracell International Inc.

[21] Appl. No.: 182,902

[22] Filed: Sep. 2, 1980

[51] Int. Cl.$^3$ .............................................. H01M 6/14
[52] U.S. Cl. ...................................... 429/50; 429/196; 429/101; 429/105
[58] Field of Search ............... 429/194, 196, 199, 105, 429/50, 101

[56] References Cited

U.S. PATENT DOCUMENTS 3,567,515  3/1971  Maricle et al. ..................... 429/196
3,953,234  4/1976  Hoffmann ............................ 429/199

*Primary Examiner*—Donald L. Walton
*Attorney, Agent, or Firm*—Ronald S. Cornell; Israel Nissenbaum

[57] ABSTRACT

A rechargeable non-aqueous electrochemical cell with a complex electrolyte salt such as a complex of an alkali metal salt and an ether.

19 Claims, No Drawings

RECHARGEABLE NON-AQUEOUS CELLS WITH COMPLEX ELECTROLYTE SALTS

This invention relates to electrolyte salts used in non-aqueous electrochemical cells and particularly to cells having lithium anodes and $SO_2$ electrolyte solvent-/cathode depolarizers.

Electrochemical cells having sulfur dioxide solvents have generally required the further addition of organic electrolytes therewith in order to fully solvate the common electrolyte salts. As described in U.S. Pat. No. 3,953,234, the sulfur dioxide and organic cosolvent function as a single bifunctional solvent. The $SO_2$, because it is an electron acceptor solvates the electrolyte salt anion and the organic cosolvent, having unshared electron pairs, solvates the generally metallic cation. Without the organic cosolvent the sulfur dioxide is generally unable to usefully solvate common electrolyte salts. However, the utilization of the organic cosolvents introduces an unstable element within the cell since the organic cosolvents are polar and tend to slowly react with the alkali metal anodes commonly used in non-aqueous cells. Furthermore the organic cosolvents tend to detrimentally affect secondary cell performance. During charge and discharge cycles of secondary cells having organic solvents therein the organic solvents tend to irreversibly react or decompose thereby steadily deteriorating efficiency of such cells as rechargeable cells.

It is an object of the present invention to provide novel electrolyte salts for electrochemical cells and in particular for cells containing $SO_2$ solvents without the necessity for organic cosolvents.

It is a further object of the present invention to provide such electrolyte salts for use in secondary cells wherein deterioration of cycling performance is minimized thereby.

These and other objects, features and advantages of the present invention will become more evident from the following discussion.

Generally the present invention comprises an electrochemical cell containing a complex electrolyte salt. The salt is formed by the coordination or complexing of an alkali or alkaline earth metal salt with stoichiometric amounts of an ether such as a cyclic or aliphatic ether. The complex salt is thereafter utilized in the electrochemical cell as the electrolyte salt thereof. It has been discovered that such complex salts are appreciably soluble in $SO_2$ without the necessity of additional organic cosolvents and that such salts provide high ionic conductivities. As a result, cells having lithium anodes and sulfur dioxide electrolyte solvent/cathode depolarizers do not require additional organic cosolvents which have hindered efficient cycling of such cells as rechargeable cells. The alkali metal or alkaline earth metal salts are coordinated with stoichiometric amounts of the cyclic or aliphatic ethers such that there is no free organic material in the aforementioned rechargeable cells. The ethers initially complex with the cation of the electrolyte salt such that the solvation of the anion by the sulfur dioxide solvent thereafter is sufficient to appreciably solvate the salt with resultant high ionic conductivity of the solution.

Electrolyte salts such as lithium perchlorate, lithium bromide, lithium chloride, lithium iodide, lithium tetrafluoroborate, lithium hexaflucrarsenate and lithium hexafluorophosphate, and similar alkali and alkaline earth metal salts, are normally insufficiently soluble in $SO_2$ to provide a conducting electrolyte solution. However, when salts such as these are stoichiometrically complexed with ethers such as dimethoxyethane (DME); 1,4 dioxane (DO); 1,3 dioxolane (DX); diglyme (DG); triglyme (TG); and tetrahydrofuran (THF) their solubility and conductivity in $SO_2$ is dramatically enhanced. Of the aforementioned ethers, DME is the most preferred because its complexing with metals of electrolyte salts is least sterically hindered and therefore occurs to the greatest extent. It is believed that with a lithium salt and DME, each lithium cation in the salt tetrahedrally coordinates with two molecules of the dimethoxyethane at the electron rich oxygen sites:

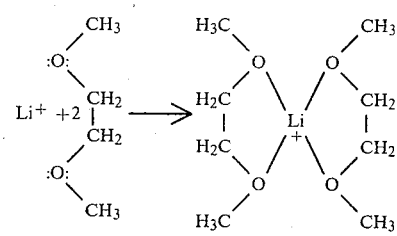

The $Li^+$ cations are bound by the DME with solubility, in $SO_2$, of the salt being enhanced by the great increase in bulk of the cation. With the DME being bound with the $Li^+$ there is also no free organic solvent in the cell. Similar coordinating and complexing occur with other alkali or alkaline earth metal salts and other ethers.

The complex salts of the present invention are made, for example, by dissolving a salt such as lithium perchlorate into an ether such as DME. As the perchlorate dissolves, the solution becomes warm and as the solution cools to room temperature a precipitate forms. The precipitate is removed and dried to give a white solid material which is the electrolyte salt of the present invention. The salt is believed to have the stoichiometric formula $Li(DME)_2 ClO_4$. The obtained salt when dissolved in $SO_2$ provides a clear solution.

Though complex electrolyte salts have been previously described in U.S. Pat. No. 3,764,385 such salts comprise a complex between an inorganic lithium salt and a tertiary amine. These salts are not similar to the ether complexed salts of the present invention. The complex salts of said patent in addition to providing a relatively low ionic conductivity (generally less than $10^{-3}$ $ohm^{-1}cm^{-1}$) have amine constituents which are subject to detrimental hydrogen evolution especially in the presence of a lithium anode. This is in contrast to the relatively high conductivity ($1.7 \times 10^{-2}$ $ohm^{-1}cm^{-1}$ for $Li(DME)_2ClO_4$) and stability of the salts of the present invention.

The complex salts of the present invention are useful in cells containing alkali and alkaline earth metal anodes. It is preferred that such salts, when used in secondary cells, have cations corresponding to the anode metal.

It is further noted that complexing of metal cations of electrolyte salts (such as with an ether) in rechargeable cells having $SO_2$ solvent/cathode depolarizers improves the recharging characteristics thereof in accordance with the present invention. However, the complexing, in order to be effective in providing such improvement, must enable the electrolyte salt to become soluble in the $SO_2$ without organic cosolvents and further should provide a conductivity in said SO₂ solvent in excess of $10^{-2}$ ohm$^{-1}$cm$^{-1}$ at room temperature.

In order to more fully illustrate the present invention the following examples are presented. It is understood that such examples are for illustrative purposes only and that any details contained therein should not be construed as limitations on the present invention. Unless otherwise indicated all parts are parts by weight.

EXAMPLE 1

A 'D' size cell is made with a lithium foil anode (20" (50.8 cm)×1½" (3.8 cm)×0.020" (8.05 cm)) and a carbon cathode on an expanded aluminum substrate (20"(50.8 cm)×1¾"(4.4 cm)×0.025"(0.06 cm))spirally wound together with a polypropylene separator therebetween. The cell is filled with a 1 M Li(DME)₂ClO₄ in SO₂ electrolyte solution (about 40 grams)/cathode depolarizer, is thereafter put on a cycling regimen of 0.5 A for four hours discharge and then four hours charge. The cell delivers about 68 Ahrs—about 3½ times initial lithium capacity and over 5 times initial capacity of the SO₂ cathode depolarizer.

EXAMPLE 2

A cell as in Example 1 is discharged and charged repeatedly to 2.5 volts and 4.0 volts respectively and delivers about 58 Ahrs, about 3 times initial lithium capacity and about 4½ times initial SO₂ capacity.

It should be understood that the above examples are for illustrative purposes only and that changes in cell structure and composition may be made without departing from the scope of the present invention. It should be further understood that though the electrolyte salts of the present invention have particular use in rechargeable cells, they are equally utilizable in primary cells and they are further useful in cells having depolarizers other than SO₂ whether soluble or solid.

What is claimed is:

1. A non-aqueous electrochemical cell comprising an anode, a cathode and an electrolyte solution comprised of an electrolyte salt dissolved in an electrolyte solvent characterized in that said electrolyte salt comprises a metal salt complexed with a stoichiometric amount of an ether and wherein said cell is substantially free of said ether which is uncomplexed.

2. The cell of claim 1 wherein said ether is selected from the group consisting of dimethoxyethane; tetrahydrofuran; 1,4 dioxane; 1,3 dioxolane; diglyme and triglyme.

3. The cell of claim 2 wherein said metal salt is selected from the group consisting of perchlorates, bromides, chlorides, iodides, hexafluoroarsenates, hexafluorophosphates and tetrafluoroborates of alkali and alkaline earth metals.

4. The cell of claim 3 wherein said alkali metal is lithium.

5. The cell of claim 4 wherein said anode is comprised of lithium.

6. The cell of claim 5 wherein said electrolyte solvent consists essentially of SO₂.

7. An electrochemical cell comprising a lithium metal anode, a cathode and an electrolyte salt dissolved in a sulfur dioxide electrolyte solvent/cathode depolarizer characterized in that said electrolyte salt comprises a lithium salt complexed with a stoichiometric amount of dimethoxyethane and wherein said cell is substantially free of dimethoxyethane which is uncomplexed.

8. The cell of claim 7 wherein said lithium salt is lithium perchlorate.

9. A method for improving the rechargeability of an electrochemical cell having an SO₂ electrolyte solvent/cathode depolarizer comprising the steps of complexing a metal salt with a stoichiometric amount of a complexing material and dissolving said complexed metal salt in said sulfur dioxide solvent, wherein said complexing increases solubility and conductivity of said metal salt within said SO₂ and wherein said cell is substantially free of uncomplexed organic solvents.

10. The method of claim 9 wherein said complexing material is an ether.

11. The method of claim 10 wherein said ether is selected from the group consisting of dimethoxyethane; tetrahydrofuran, 1,4 dioxane; 1,3 dioxolane; diglyme and triglyme.

12. The method of claim 11 wherein said inorganic metal salt is selected from the group consisting of perchlorates, bromides, chlorides, iodides, hexafluoroarsenates, hexafluorophosphates and tetrafluoroborates of alkali and alkaline earth metals.

13. The method of claim 12 wherein said cell contains an anode comprised of a metal corresponding to the metal of said salt.

14. The method of claim 13 wherein said metal is lithium.

15. The method of claim 14 wherein said ether is dimethoxyethane.

16. The method of claim 15 wherein said salt is lithium perchlorate.

17. The cell of claim 3 wherein said metal salt is LiBr and said ether is triglyme.

18. The cell of claim 3 wherein said metal salt is LiBF₄ and said ether is dimethoxyethane.

19. The cell of claim 3 wherein said metal salt is LiBr and said ether is dimethoxyethane.

* * * * *